May 30, 1972     E. RICH ET AL     3,666,631
BACTERIAL CONTAMINATION MONITOR
Filed Dec. 31, 1969     2 Sheets-Sheet 1
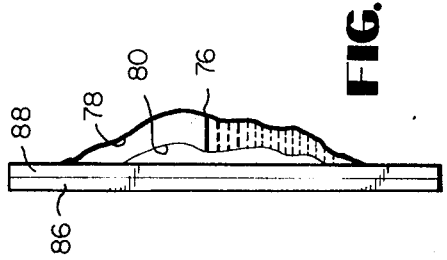
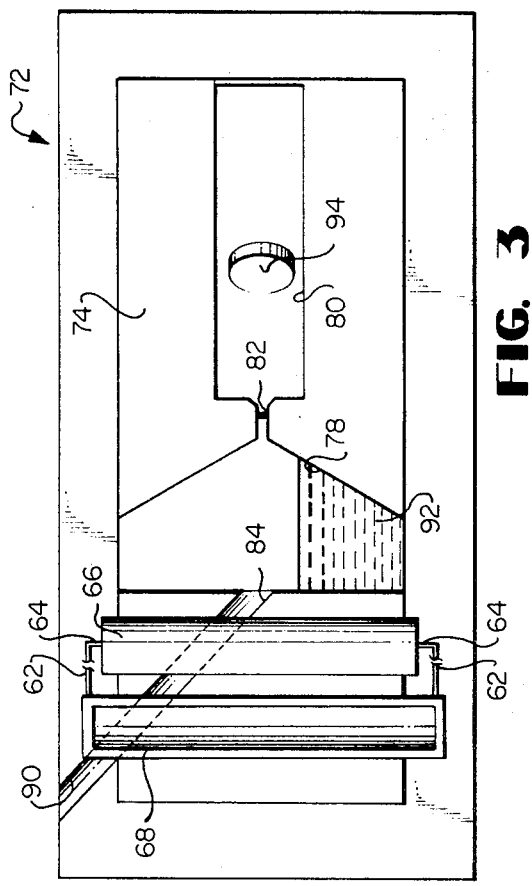
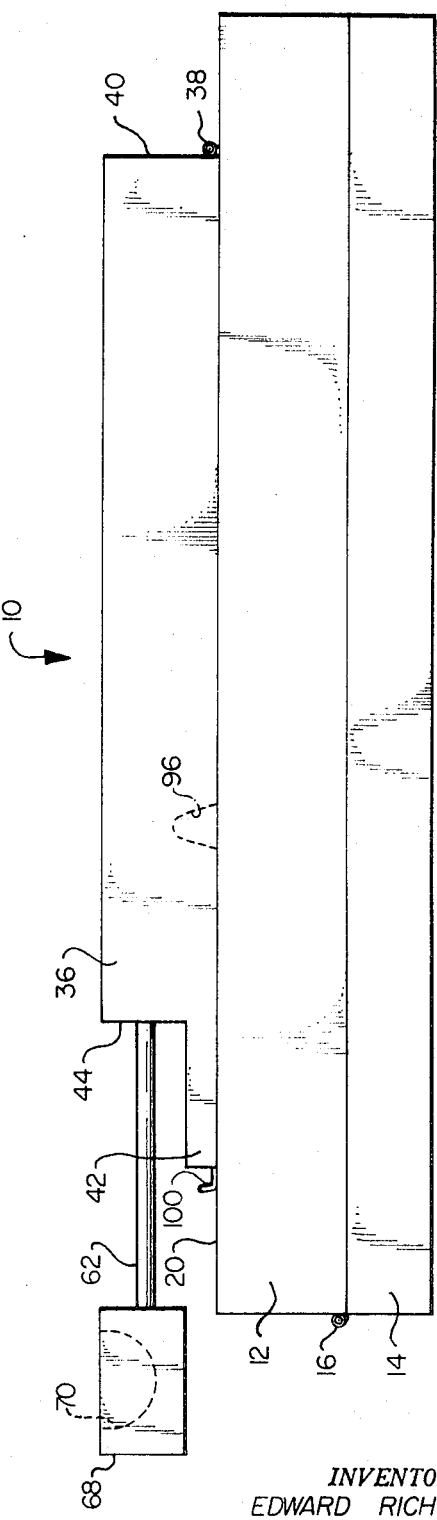
INVENTOR.
EDWARD RICH
NORMAN H. MacLEOD
BY
ATTORNEYS

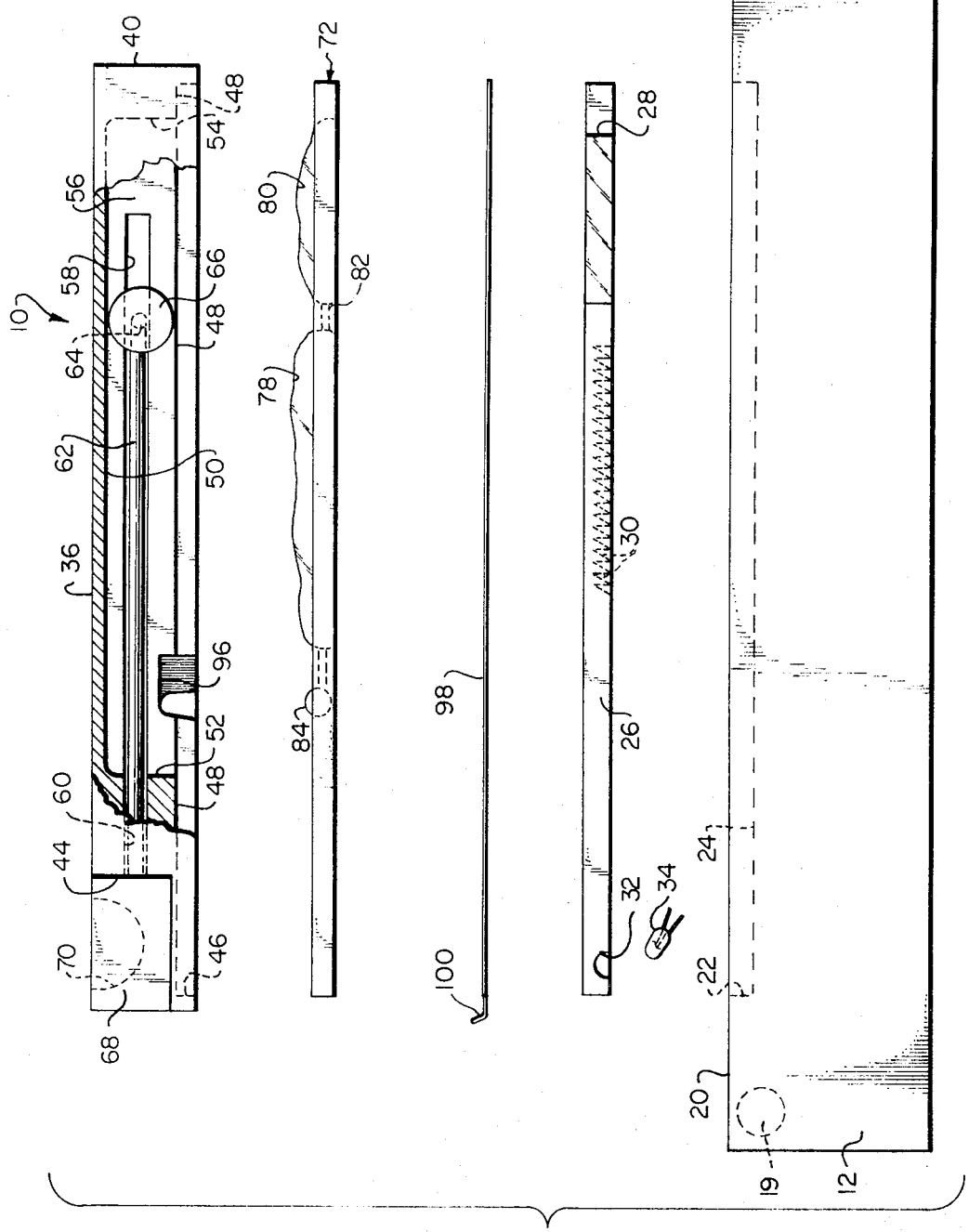

United States Patent Office 3,666,631
Patented May 30, 1972

3,666,631
BACTERIAL CONTAMINATION MONITOR
Edward Rich, College Park, and Norman H. MacLeod, Chevy Chase, Md., assignors to the United States of America as represented by the Administrator of the National Aeronautics and Space Administration
Filed Dec. 31, 1969, Ser. No. 889,420
Int. Cl. C12k 1/10
U.S. Cl. 195—127       7 Claims

ABSTRACT OF THE DISCLOSURE

A portable testing instrument for determining the level of bacterial and other microbial (algal, protozoal, etc.) contamination within a monitored sample without the need for external electric recording devices or external power source. The invention utilizes an adenosine tri-phosphate (ATP) light reaction, the intensity of which is directly proportional to the presence of the ATP. High-speed film is used for time displaying the low level of biochemical light produced, the light exposure intensity being compared to a calibrated scale for determination of the bacterial contamination level. Additionally, the instrument incorporates a novel disposable packaging concept for storing and producing the biochemicl reaction.

---

The invention described herein was made by employees of the United States Government and may be manufactured and used by or for the Government for governmental purposes without the payment of any royalties thereon or therefor.

FIELD OF THE INVENTION

This invention relates to a portable testing instrument for determining within a specified sample, the level of bacterial and other microbial (algal, protozoal, etc.) contamination and growth without the need for external recording devices or an external power source. As used hereinbelow, all reference to the term "bacterial contamination" is meant to include other microbial contamination and growth.

BACKGROUND OF THE PRIOR ART

Prior art quantitative analysis for bacterial contamination requires extensive laboratory facilities and involves a relatively long elapsed time for growing bacterial cultures. Examination of liquid form samples heretofore required elaborate instrumentation and other equipment not suitable for portable operation.

BRIEF DESCRIPTION

The present invention relates to method and portable apparatus for determining the level of bacterial contamination of liquid samples. The apparatus is incorporated into a portable testing instrument utilizing a disposable chemical storage envelope having a first compressible chamber provided with a filler tube through which a quantity of sample is introduced. A pressure roller is advanced to force the sample into the first chamber where it is mixed with a stored quantity of butanol, magnesium ion and water. An intermediate reaction takes place with the result that adenosine tri-phosphate (ATP) is extracted. The roller is further advanced to compress the first chamber and force the ATP through a frangible seal and into a second compressible chamber containing freeze-dried luciferin and luciferase. The ATP reacts in the presence of oxygen with the luciferin and luciferase to produce light. The light intensity is recorded by a Polaroid film, the resultant degree exposure then being compared with a calibrated chart of exposure levels to determine the relative level of bacterial contamination of the sample of the test.

Accordingly, it is an object of the present invention to provide a portable instrument for determining the bacterial level of a sample within a relatively short period of time and without the need for electric recording devices or external power source.

Another object of the present invention is to provide a portable instrument for monitoring bichemical reactions and requiring only two moving parts.

A further object of the invention is to provide a disposable package for storing chemicals, which, when mixed with a sample, produce a biochemical reaction, the reaction prdoucts of which may be permanently recorded and compared to a calibrated chart for a quantitative analysis.

Other objects and many attendant advantages of the present invention will become apparent upon perusal of the following detailed description of the preferred embodiments taken in conjunction with the accompanying drawings.

DESCRIPTION OF THE DRAWINGS

FIG. 1 is an elevation of a preferred embodiment illustrated with a handle in a protruding position;

FIG. 2 is an exploded view of the device shown in FIG. 1 with parts partially in section to illustrate details thereof;

FIG. 3 is a schematic plan view illustrating a disposable chemical package with a handle operated roller shown superposed thereover; and FIG. 4 is an end view of the disposable package shown in FIG. 3.

DESCRIPTION OF THE PREFERRED EMBODIMENTS

With more particular reference to the drawings, there is illustrated in FIGS. 1 and 2, a bacterial contamination monitor generally illustrated at 10 and including an enlarged, generally rectangular camera housing 12 having an inverted bottom cover plate portion 14 secured pivotally by hinges 16 to the camera housing 12. The camera housing 12 is further provided interiorly thereof with a self-developing film assembly, a portion illustrated at 18 in FIG. 2 and including typically Polaroid ASA 10,000 instrumentation film. The cover plate portion 14 provides access to the film assembly 18. The particular details of the film assembly 18 will not be described since such an assembly is well-known in the prior art. As shown particularly in FIG. 2, the housing 12 contains, adjacent one end, a battery shown in phantom outline at 19. Further, the housing is provided with a generally planar horizontal surface 20, in turn, provided with a generally central rectangular recess 22 having a bottom wall shoulder portion 24 defining a rectangular rim encircling the inner periphery of the rectangular recess 22. The recess 22 communicates with the interior of the camera housing 12, and the peripheral shoulder 24 is in parallel planar relationship to the portion of film adapted for exposure as later explained in conjunction with operation of the camera assembly.

With reference yet to FIG. 2, taken in conjunction with FIG. 1, a preferred embodiment further includes a generally rectangular transparent plastic plate 26 adapted to be received entirely within the recess 22 and in abutment against the peripheral shoulder 24. One end portion of the plate 26 serves as a transptrent window, indicated at 28. Immediately adjacent to the transparent portion 28 of the plate 26 serves as a transparent window, indicated grooves 30 having vertical and inclined vertical side walls serving as a light filtering window portion in said plate 26. The filtering window portion formed by the grooves 30 is thus adjacent to the end portion of the plate 26 providing the transparent window portion 28, and is in spaced relationship from the remaining end portion of the plate 26. Such remaining end portion is provided therein with an inverted recess 32 adapted to receive a battery-powered miniature light bulb 34 adapted for connection in any well-known manner to the battery 19 which supplies power thereto. Additionally, the plate 26 is provided thereover with a light opaque coating of paint, for example. The coating is applied in such a manner as to permit light transmittance through the plate 26 only through the transparent window 28 and the filtering window 30.

With the plate 26 entirely within the recess 22, the housing 12 is provided thereover with a generally reduced rectangular cover 36 mounted generally centrally on the planar surface 20 of the housing 12 and attached thereto by a hinge 38 mounted along one end portion 40 of the cover 36. The remaining end portion 42 of the cover 36 is provided with an enlarged lateral rectangular relieved portion on notch 44. Additionally, the bottom of the cover is provided with a generally central inverted enlarged rectangular recess 46 having a bottom wall 48 extending partially under and parallel to said rectangular notch 44. The recess 46 communicates with a reduced rectangular inverted recess 50 provided in the bottom wall 48. The recess 50 is defined by an end wall 52 in spaced relationship with respect to the notched portion 44. The remaining end wall 54 of the recess 50 is adjacent the remaining end portion 40 of the cover 46. The reduced rectangular recess 50 is further defined by a pair of parallel opposed side walls, one of which is shown at 56, extending between the end walls 52 and 54. As shown in FIG. 2, the inverted bottom wall 48 of the recess 46 peripherally surrounds the ends walls 52 and 54 and the side walls 56. Additionally, the opposed side walls 56 are provided respectively with parallel elongated opposed grooves, one of which is shown at 58, extending parallel to and in spaced relationship with said bottom wall 48. Each of the grooves 58 is coaxial with an elongated bore 60 which extends each respective track 58 through the vertical end wall 52 and in communication with the relieved notched portion 44.

With more particular reference to FIG. 2, taken in conjunction with FIG. 3, each respective aligned bore 60 and track 58 slidably receives therein a horizontally extending rod length 62. More particularly, each rod 62 is inserted through a respective bore 60 and accordingly is recessedly received within an aligned groove 58. First end portions 64 of the rods 62 are secured to a cylindrical roller 66 extending substantially the entire distance between the opposed vertical side wall 56 of the recess 50. The remaining end portions of the rods 62 extend through a respective bore 60 and are secured to a generally rectangular handle 68. The handle 68 is generally of the same rectangular dimensions as the rectangular notch portion 44 and is adapted to be removably received entirely within the notch, as illustrated in FIG. 2. The handle 68 is provided with an elongated vertically recessed channel 70 adapted to be manually grasped by a user for a purpose to be described hereinafter.

With more particular reference to FIGS. 3 and 4, a preferred embodiment of a disposable chemical-containing package will be described in detail. With reference to FIGS. 3 and 4, a chemical-containing package is generally illustrated at 72 and is fabricated from two overlying sheets 74 and 76 of a light transparent plastic. For example, the plastic sheets 64 and 76 are heat-sealed together at their overlying peripheral margins so as to form a first enlarged collapsible chamber 78 and a second smaller collapsible chamber 80. The chambers 78 and 80 are connected by an initially closed frangible orifice 82. Additionally, the chamber 78 is provided with an elongated collapsible passageway 84 providing a filling tube therefor. For example, the chambers 78 and 80, the orifice 82 and the filler tube 84 may be fabricated by selectively heat-sealing together the overlying plastic sheets 74 and 76. The outer peripheral margins of the heat-sealed together sheets 74 and 76 may be sandwiched between two substantially rigid frames 86 and 88, which frames, when secured together in aligned overlying relationship, cooperate to provide support and rigidity to the margins of the plastic sheets. As particularly illustrated in FIG. 3, each frame is provided with a channel 90 providing clearance for the collapsible filler tube 84. For example, the chamber 78 may be provided therein with a selected quantity of butanol, magnesium ion and water with a total volume of approximately 5 milliliters. The chamber 80 is provided with a pelletized freeze-dried luciferin and luciferase 94.

With more particular reference to FIG. 2, the chemical-containing package 72 is adapted to be received entirely within the enlarged rectangular inverted recess 46 of the cover 36, one of the frame portions 86 or 88 seating against the inverted bottom wall 48 of the recess 46. With the package thus inserted, the chambers 78 and 80, as well as a portion of the filler tube 84, partially protrude into the reduced rectangular recess 52. One of the vertical side walls 56 is provided with a channel-shaped opening 96 adapted to receive the filler tube 84 therein. Accordingly, the filler tube 84 communicates exteriorly of the cover 36 through the opening 96. The chamber 80 is thereby purposely positioned in registration with the transparent window 28, for a purpose to be explained.

With reference to FIGS. 1 and 2, the device 10 further includes a removable light opaque thin sheet slide 98 provided with a handle 100 and adapted to be slidably interposed between the cover 36 and the planar surface 20 of the camera housing 12 in order to cover the plate 26 and to separate such plate from the chemical package 72 contained within the cover 36.

In operation, the hinge-mounted bottom cover 14 allows access to the camera housing 12 in order to load the self-developing film assembly 18 therein. The hinged cover 36 is pivotally opened to permit insertion of a chemical-containing package 72 within the inverted recess 46. A user of the device then grasps the recess 70 of the handle 68 and manually removes the handle from the rectangular notch 44, causing the rods 62 to slidably traverse within the tracks 58 and further causing withdrawal of the roller 66 until it becomes stopped against the vertical end wall 52. Accordingly, with the roller 66 stopped against the end wall 52 and the chemical-containing package 72 properly inserted in the recess 46, the cover 36 is pivotally closed to overlie the slide 98 and the plate 26. The slide 98 is then manually removed from the device 10. A quantity of sample to be tested is then injected in the filler tube 84 of the chemical package, for example, by utilizing a small needleless syringe.

With reference to FIG. 3, taken in conjunction with FIG. 2, the roller 66 is partially advanced by manually reciprocating the handle 68. Such partial roller advancement accomplishes two functions. More particularly, the cylindrical surface of the roller 66 traverses the length of the filler tube 84, serially compressing the entire length of the tube 84 against the plate 26. Such compressing action introduces the sample into the first chamber 78, where it is mixed with the chemical mixture therein. Additionally, the compressing action of the roller seals the tube 84 preventing escape of the chamber contents. The sample under test is then permitted to mix with the chemicals contained in the chamber 78 for a time period of approximately five minutes, during which time the adenosine tri-phosphae extant in the sample is extracted therefrom. At the end of the lapsed time period, the roller is then manually advanced until the handle 68 is seated in the notched portion 44 of the cover 36. Such advancement of the roller 66 serially compresses the chamber 78, continuously decreasing its effective volume. The constituents of the chamber 78 are thus progressively compressed, the internal pressure of the chamber increasing until rupture of the frangible orifice 82 occurs. Then continued advancement of the roller forces the constituents of the chamber 78 through the orifice 82 and into the second chamber 80. Accordingly, the extracted adenosine triphosphate of chamber 78 is mixed with the luciferin and luciferase of the chamber 80, the roller in its thus advanced position sealing off the orifice 82 by compressing the same against the plate 26. Accordingly, within the chamber 80 the well-known biochemical reaction [as generally described by W. D. McElroy in the Proceedings of the National Academy of Sciences, vol. 30, pages 342–345 (1947)] ocurs wherein excess amounts of luciferase, luciferin, oxygen and magnesium ion react with the ATP to produce light. The intensity of light produced is directly proportional to the amount of ATP extracted. The light reaction produced is then transmitted through the window 28, in registration with the chamber 80, and is recorded on the film assembly 18 for a period of ten seconds exposure, effected by any well-known camera shutter mechanism (not shown). Accordingly, the intensity of the light produced in the chamber 80 is recorded by the film portion that is immediately adjacent the transparent window 28 of the plate 26. The calibration bulb 34 is activated by the battery 19, for example, by the same shutter mechanism, for the same ten-second exposure. Rays of light emanating from the bulb 34 traverse through the length of the transparent plastic plate 26 and, by well-known optical principles, is reflected by the selected vertical wall and inclined vertical wall geometries of the grooves 30, downwardly to expose an area of film immediately adjacent to the film recorded light reaction.

The degree of exposure produced by the calibration bulb 34 permits determination of the relative light intensity due to background effects. Accordingly, the relative intensity of recorded light produced from the biochemical reaction is then compared to a calibrated scale (not shown) for properly determining the relative level of contamination in the sample under test.

Upon removal of the exposed film from the camera housing 12, an unexposed portion of film is automatically brought into registration under the window 28, in accordance with well-known Polaroid film assembly operation. Accordingly, before opening the cover 36 to replace the chemical pack 72, the light opaque slide 98 must be inserted as described to prevent exposure of the film when the cover is pivotally opened.

Accordingly, the present invention provides a portable instrument allowing relatively quick determination of the level of bacterial contamination. Of course, the other embodiments and modifications of the present invention are to be included in the scope of the appended claims.

We claim:
1. A bacterial contamination monitor comprising:
a camera housing,
photosensitive recording film operatively mounted in said camera housing,
a cover mounted on said housing completely overlying said recording film,
a chemical package in said cover and including a first chamber,
and a second chamber in communication with said first chamber,
said first chamber being adapted to receive a quantity of sample to be monitored,
said first chamber and said second chamber adapted for containing, respectively, a first chemical capable of extracting adenosine triphosphate from said sample and a second chemical capable of reacting with adenosine triphosphate to produce light,
transfer means for cooperating with said first chamber capable of forcing the contents of said first chamber into said second chamber to produce a biochemical light reaction, and
transparent means positioned between said second chamber of said chemical package and said recording film adapted to permit the light emitted from said biochemical light reaction to impinge upon said recording film so that the intensity of said light reaction is capable of being recorded on said film.

2. The structure as recited in claim 1 wherein said chemical package is disposable, and further including, a frangible seal separating said first chamber and said second chamber, and rupture means for rupturing said seal.

3. The structure as recited in claim 2, wherein said first chamber and said second chamber are compressible and wherein said transfer means and said rupture means are within a single unit comprising a roller operable for compressing said first chamber and forcing said sample and said first chemical to rupture said seal and transfer into said second chamber.

4. The structure of claim 1, and further including, a battery and a lightbulb operatively connected to said battery, said film simultaneously recording on separate portions thereof, respectively, said biochemical light reaction and the light intensity emanating from said lightbulb.

5. The structure of claim 4, wherein said transparent means is a transparent plate, and further including a reflecting plate integral with and adjacent to said transparent plate, said reflecting plate having a series of grooves therein and further being provided with a recess receiving said lightbulb, whereby the light from said biochemical reaction passes through said transparent plate directly onto a first portion of said film and the light from said lightbulb is reflected by said series of grooves in said reflecting plate onto a second portion of said film.

6. The structure as recited in claim 3, wherein said first chamber is provided with a compressible filler tube adapted to receive said sample to be monitored, said roller being manually actuable to traverse the length of the filler tube and compress the same, thereby introducing the sample to said first chamber and simultaneously sealing the filler tube.

7. The structure as recited in claim 6, wherein said package is disposable and fabricated with overlying plastic sheets sealed together to define said filler tube and said first and second chambers, and further including a frame surrounding said sheets.

References Cited

UNITED STATES PATENTS 3,437,560   4/1969   Seamans _____ 195—103.5 X
3,520,660   7/1970   Webb _____ 23—253 R

OTHER REFERENCES

Chase: "Methods of Biochem. Analysis," Glick-editor, 8:82–84, 94.

A. LOUIS MONACELL, Primary Examiner
M. D. HENSLEY, Assistant Examiner

U.S. Cl. X.R.
195—103.5 R, 54